United States Patent

Perkins

[11] Patent Number: 6,097,448
[45] Date of Patent: Aug. 1, 2000

[54] VEHICLE MOUNTING FOR AUDIOVISUAL EQUIPMENT

[76] Inventor: Walter T. Perkins, 1100 W. Newton Rd., Greensburg, Pa. 15601

[21] Appl. No.: 08/785,259

[22] Filed: Jan. 21, 1997

[51] Int. Cl.[7] ............................... H04N 5/72; B60R 7/04
[52] U.S. Cl. ...................... 348/837; 224/275; 224/572; 382/22
[58] Field of Search ..................... 348/837, 844, 348/825; 224/275, 572, 915, 539, 160, 161; 296/37.8, 37.15, 37.16; 297/188.06, 188.09, 188.07; 383/40, 41, 38, 22, 16; H04N 5/72

[56] References Cited

U.S. PATENT DOCUMENTS

| | | |
|---|---|---|
| 3,372,896 | 3/1968 | Myers et al. . |
| 4,383,626 | 5/1983 | Weinblatt . |
| 4,635,110 | 1/1987 | Weinblatt . |
| 4,982,996 | 1/1991 | Vottero-Fin et al. . |
| 5,044,321 | 9/1991 | Selph . |
| 5,326,175 | 7/1994 | Carter ......................................... 383/22 |
| 5,338,081 | 8/1994 | Young et al. . |
| 5,397,160 | 3/1995 | Landry . |
| 5,803,325 | 9/1998 | Wang ...................................... 224/275 |
| 5,868,294 | 2/1999 | Webster .................................. 224/275 |

Primary Examiner—Michael H. Lee
Attorney, Agent, or Firm—Terrance L. Siemens

[57] ABSTRACT

A carrier for mounting audiovisual equipment in a passenger vehicle between two passenger seats. The carrier comprises a harness substantially encircling the audiovisual equipment, straps projecting from the harness, for engaging the seats, and a flexible, transparent cushion disposed over the screen of the audiovisual equipment. Preferably, four straps are provided, two on the right side of the harness and two on the left side thereof. One strap on each side is located at a high position on the harness, and one on a low position, so that the carrier is substantially prevented from inclining responsive to vehicle motion.

4 Claims, 1 Drawing Sheet

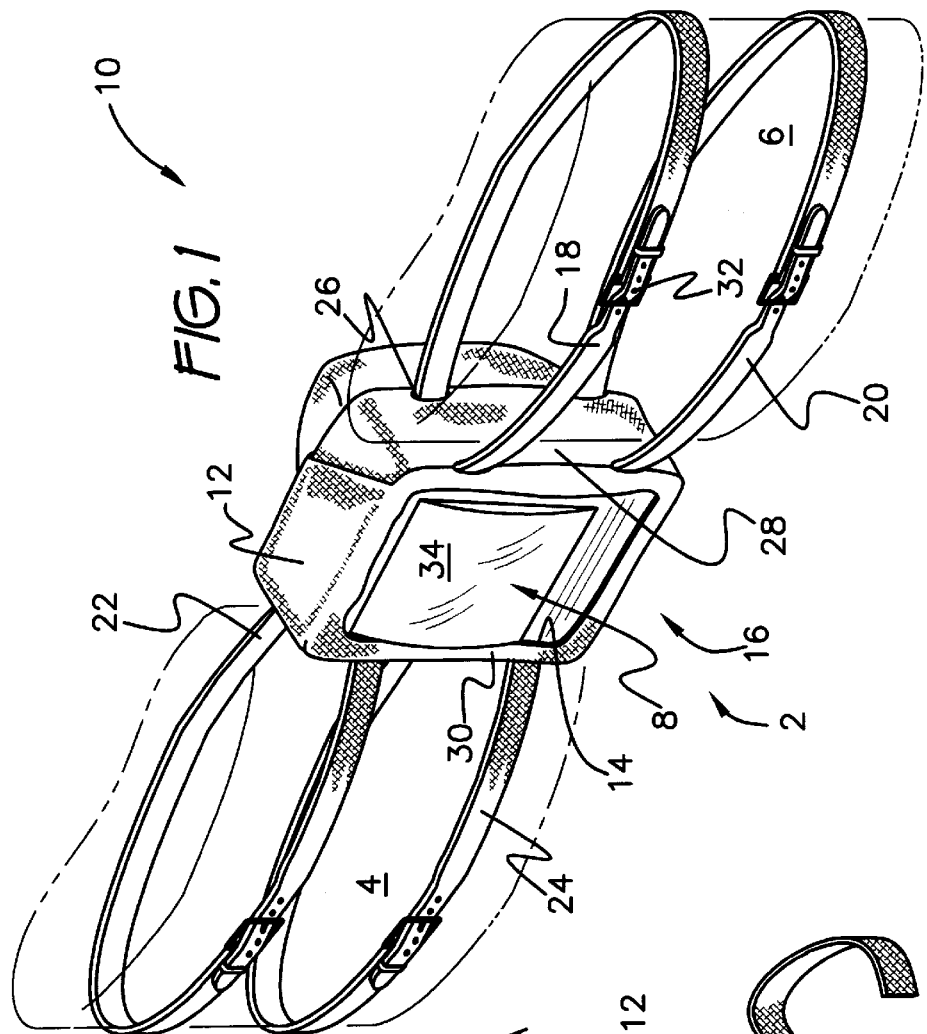
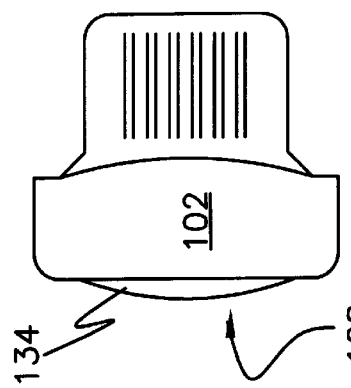
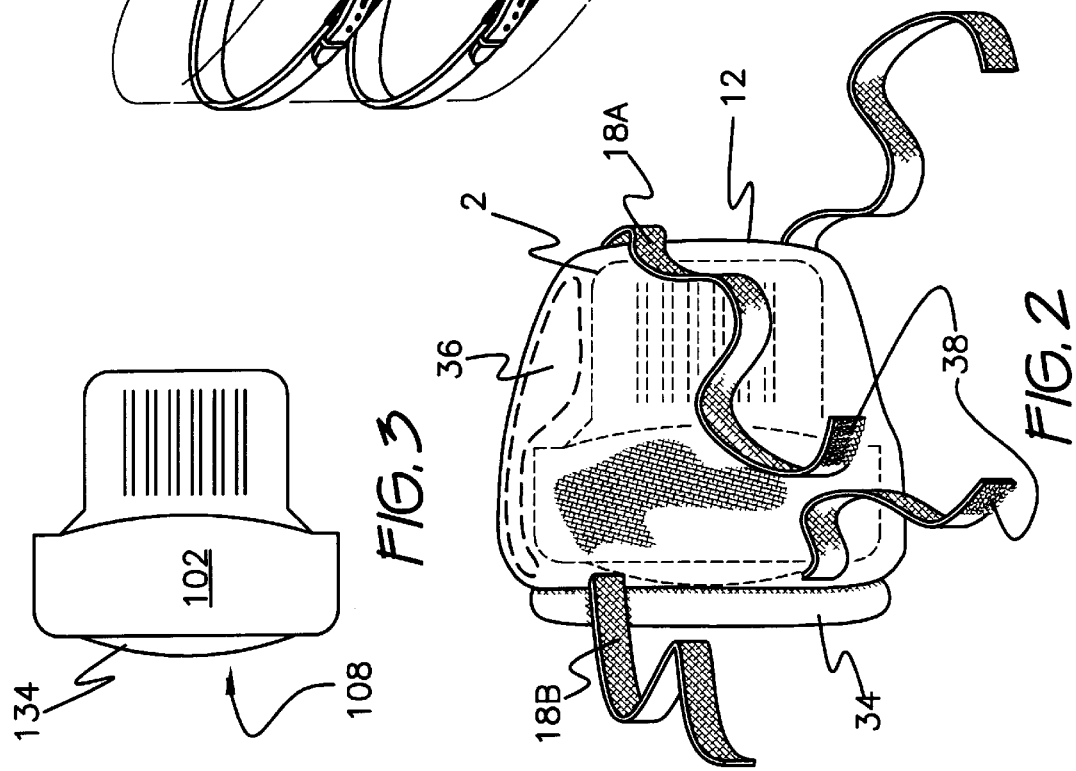

VEHICLE MOUNTING FOR AUDIOVISUAL EQUIPMENT

BACKGROUND OF THE INVENTION

1. Field of the Invention

The present invention relates to a method and apparatus for carrying and protecting audiovisual equipment having a viewing screen, such as a cathode ray tube, within a motor vehicle. The apparatus comprises a harness for engaging the equipment and for fastening the harness to the vehicle, and a resilient, transparent cushion for covering the screen.

2. Description of the Prior Art

With the advent of electronics and miniaturization of electronic devices, there has come an awareness that audiovisual equipment may be mounted in a motor vehicle for viewing by passengers. In particular, cathode ray tube (CRT) devices, such as television sets and monitoring screens for computers could be utilized while the vehicle is in operation.

CRT devices, although available in myriad configurations and dimensions, are not immediately compatible with interiors of motor vehicles. Hence, they must be provided with suitable apparatus for mounting within the cabin of a motor vehicle. One convenient location for a CRT is between adjacent front seats in an automobile or van.

The prior art has suggested a number of devices for mounting a CRT device in this location. Examples are seen in U.S. Pat. No. 4,383,626, issued to Lee S. Weinblatt on May 17, 1983, U.S. Pat. No. 4,635,110, issued to Lee S. Weinblatt on Jan. 6, 1987, U.S. Pat. No. 4,982,996, issued to Alberto Vottero-Fin et al. on Jan. 8, 1991, and U.S. Pat. No. 5,397,160, issued to Richard P. Landry on Mar. 14, 1995. In each example, a substantially rigid bracket or frame is provided. Weinblatt and Landry secure their respective devices to the car by straps. However, the strapping scheme is different from that of the present invention. Also, the present invention relies little upon a substantially rigid device. In a further departure from the prior art, the present invention includes a transparent cushion for protecting the screen. The device of Vottero-Fin et al. differs from the present invention by being incorporated into an armrest having substantially rigid construction and lacking the screen cushion of the present invention.

A device more similar in basic character to that of the present invention is shown in U.S. Pat. No. 5,044,321, issued to Lottie J. Selph on Sep. 3, 1991. However, Selph's device has a receptacle or pouch open at the top, rather than laterally, as would be required for operably supporting a CRT device. Also, support straps of Selph are not designed to control sway which could occur were a CRT device supported thereby. There is no transparent cushion for protecting a screen of a CRT device.

None of the above inventions and patents, taken either singly or in combination, is seen to describe the instant invention as claimed.

SUMMARY OF THE INVENTION

The present invention provides a carrier suitable for holding audiovisual equipment between two front seats of a motor vehicle in a position suitable for viewing by passengers located to the rear of the front seats. The carrier has a harness for partially encircling the audiovisual equipment, straps for mounting the carrier to the front seats, and cushioning for protection of the audiovisual equipment and of passengers located near the audiovisual equipment. A unique feature of the invention is a flexible, transparent cushion which covers the screen. This cushion protects the screen from impacts from loose objects and protects occupants of the vehicle should the screen disintegrate into dangerous shards.

Four straps secure the harness to the surrounding vehicle seat backs in a manner preventing inclination of the harness. The straps are adjustable as to diameter of the loop enclosed thereby, and as to height above the floor of the vehicle. The carrier is thus able to engage seats of differently configured vehicles, and is not reliant upon structure specially designed for cooperating with the carrier. Mounting avoids attachment to rear seats, and does not require that seat belts originally provided on the vehicle for protection of passengers be diverted to the novel carrier.

At the same time, the carrier is fully and readily attachable to and removable from the vehicle. The novel carrier is portable from vehicle to vehicle. No modification to the vehicle, such as drilling holes, is required.

Accordingly, it is a principal object of the invention to provide a carrier for supporting audiovisual equipment in an operable position within a passenger vehicle.

It is another object of the invention to anchor the novel carrier by engaging the front seats of the passenger vehicle.

It is a further object of the invention to avoid reliance upon structure of the passenger vehicle which must be specially provided to cooperate with mounting of audiovisual equipment, to avoid attaching to rear seats of the passenger vehicle, and to avoid utilizing seat belts originally provided for passengers.

Still another object of the invention is to protect the screen of audiovisual equipment against impacts and to protect occupants against shards should the screen break.

An additional object of the invention is to mount audiovisual equipment within a passenger vehicle in a manner which avoids tilting when driving.

It is again an object of the invention to avoid modification to a vehicle to mount the novel carrier.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is an environmental, perspective view of the invention supporting a CRT device between passenger seats of a motor vehicle.

FIG. 2 is an environmental, side elevational view of the invention.

FIG. 3 shows a CRT device with its screen protected according to the invention.

DETAILED DESCRIPTION OF THE PREFERRED EMBODIMENTS

Turning now to FIG. 1 of the drawings, the novel carrier 10 is shown supporting audiovisual equipment, such as CRT device 2 between left and right passenger seats 4, 6 of a passenger vehicle (not shown in its entirety). Carrier 10 comprises a harness 10. Harness 12 has a front side 14, which is designated for convenience only, for the purpose of relating harness 12 to CRT device 2 supported thereby. It is generally accepted that CRT devices have a front side defined as that bearing a screen 8. For consistency, then, the side of harness 12 having a window or opening 14 for exposing screen 8 to view will be termed the front side 16 of harness 12.

As employed herein, audiovisual equipment is understood to mean equipment comprising sound and image reproduction apparatus of any known type, a screen for displaying a reproduced image. Examples include television sets, computer monitors, videocassette recorders and players, and the like. This class of equipment usually includes a broad glass or glasslike screen for displaying visual images. Whether fabricated of glass, synthetic resin, or other materials, breakage is possible given potentially dynamic conditions inside a passenger vehicle. Thus, all types of equipment having a frangible panel comparable to a glass screen of a CRT will be encompassed under the appellation of audiovisual equipment.

Harness 12 is fabricated entirely or substantially from a fabric or similar flexible material which is sufficiently strong to bear the weight of CRT device 2 even considering forward, rearward, and lateral forces imposed from time to time by maneuvering of the vehicle during transit. Preferably, the body of harness 12 has padding (see FIG. 2) for mitigating injury or damage should an occupant or object within the vehicle strike or contact CRT device 2.

Harness 12 substantially encircles CRT device 2. This does not require totally covering CRT device 2 from exposure, but rather also encompasses partial encirelement wherein constituent material of harness 12 encircles CRT device 2 in each of three orthogonal axes.

Harness 12 preferably includes straps 18, 20, 22, 24 attached to harness 12 by stitching, as at 26 (this being typical for all straps 18, 20, 22, 24). Straps 18, 20, 22, 24 support harness 12 and the weight of CRT device 2 by engaging seats 4, 6. Straps 18 and 22 project laterally from right and left lateral sides 28, 30 (respectively) of harness 12 at a high position thereon. Straps 20 and 24 project laterally from right and left lateral sides 28, 30 of harness 12 at a low position thereon. Thus, harness 12 is anchored at at least four points to seats 4 and 6. This anchorage substantially prevents CRT device 2 from moving linearly along and pivoting or inclining about the three orthogonal axes. If desired, a bar or other rigid structure (not shown) may be formed integrally with harness 12 to provide a member for sliding adjustment of the height of the point of anchorage for each strap 18, 20, 22, or 24.

Straps 18, 20, 22, and 24 may close over seats 4 and 6 in several ways. Each strap 18, 20, 22, or 24 may include a fastener such as buckle 32. In an alternative embodiment (not shown), each strap 18, 20, 22, or 24 may comprise an elastic closed loop and constrict resiliently around seats 4 or 6.

Harness 12 preferably includes a flexible, transparent cushion 34 attached to harness 12 and disposed to cover opening 14. Screen 8 is thus protected against impacts, and occupants of the vehicle are protected against shards should screen 8 break.

FIG. 2 shows optional padding 36 and further illustrates the nature of cushion 34. Padding 36 may comprise one section or many, and may be provided at many locations on harness 12. Cushion 34 preferably has a flat front surface, so as not to unduly distort the image appearing upon screen 8.

FIG. 2 also illustrates another embodiment of a closure for straps 18, 20, 22, 24. With strap 18 (see FIG. 1) being formed in two sections 18A, 18B, overlapping surfaces of sections 18A and 18B are each provided with corresponding patches of hook and loop material 38. This construction would be typical of remaining straps 20, 22, 24.

It is not absolutely critical to the invention that four straps be provided. A single broad strap (not shown) could be provided in place of the two straps 18 and 20 or 22 and 24 provided on each side 28 or 30 of harness 12. In this manner, anchorage would be provided at both relatively high and relatively low positions on harness 12, even though only one broad strap is present on each side 28 or 30.

However, it is regarded as preferable to minimize bulk and weight of carrier 10, and hence, four total straps 18, 20, 22, and 24 are preferred.

FIG. 3 illustrates method and apparatus for protecting a screen 108 of a CRT device 102 in the absence of carrier 10. A flexible, transparent cushion 134 is secured over screen 108 in any suitable way. For example, screen 134 may be formed integrally with or permanently attached to CRT device 102. Alternatively, cushion 134 may have its own harness or straps (not shown), or still other fastening apparatus (not shown) for attachment to CRT device 102. In the embodiment of the invention including carrier 10 and in the embodiment of the invention wherein cushion 134 is provided in the absence of carrier 10, transparent cushion 34 or 134 covers an area corresponding only to that of screen 8 or 108, or of an incidentally or minimally larger or smaller area.

It is to be understood that the present invention is not limited to the embodiments described above, but encompasses any and all embodiments within the scope of the following claims.

I claim:

1. Audiovisual equipment and a carrier for supporting said audiovisual equipment between two seats of a passenger vehicle, comprising:

image reproduction apparatus having a broad glass screen;

a harness for encircling said image reproduction apparatus, said harness having a front side and right and left lateral sides, said front side having an opening disposed thereon, for exposing said screen of said image reproduction apparatus to view; and a plurality of supporting straps attached to said harness and projecting therefrom, for engaging the seats of the passenger vehicle, wherein said straps project laterally from and are anchored to said harness at said right lateral side and at said left lateral side thereof, whereby said carrier is supported at both right and left passenger seats of the vehicle.

2. The carrier according to claim 1, at least one of said straps being located at a high position on said harness, and at least one of said straps being located at a low position on said harness, whereby said carrier is constrained against inclining.

3. The carrier according to claim 1, further comprising a flexible, transparent cushion disposed over said opening and attached to said harness, whereby the screen of the audiovisual equipment is protected against impacts and occupants of the vehicle are protected against shards should the screen break.

4. Audiovisual equipment and a carrier for supporting said audiovisual equipment between two seats of a passenger vehicle, comprising:

image reproduction apparatus having a broad glass screen;

a harness for encircling said image reproduction apparatus, said harness having a front side and right and left lateral sides, said front side having an opening disposed thereon, for exposing said screen of said image reproduction apparatus to view, said harness further having a flexible, transparent cushion disposed over said opening and attached to said harness, whereby said screen of said image reproduction apparatus is protected against impacts and occupants of the vehicle are protected against shards should said screen break; and four supporting straps attached to and projecting laterally from said harness, for engaging the seats of the passenger vehicle, one of said straps disposed upon said right side of said harness at a high position thereon, one of said straps disposed upon said right side of said harness at a low position thereon, one of said straps disposed upon said left side of said harness at a high position thereon, and one of said straps disposed upon said left side of said harness at low position thereon.

* * * * *